(12) United States Patent
Nishizawa et al.

(10) Patent No.: US 7,535,555 B2
(45) Date of Patent: May 19, 2009

(54) DISTANCE MEASUREMENT DEVICE AND DISTANCE MEASUREMENT METHOD

(75) Inventors: Norihiko Nishizawa, Nagoya (JP); Toshio Goto, Nisshin (JP)

(73) Assignee: National University Corporation Nagoya University, Nagoya-shi (JP)

( * ) Notice: Subject to any disclaimer, the term of this patent is extended or adjusted under 35 U.S.C. 154(b) by 50 days.

(21) Appl. No.: 11/384,296

(22) Filed: Mar. 21, 2006

(65) Prior Publication Data

US 2007/0024842 A1    Feb. 1, 2007

(51) Int. Cl.
*G01C 3/08* (2006.01)
(52) U.S. Cl. ............... 356/5.02; 356/5.01; 356/5.13
(58) Field of Classification Search ........ 356/5.01–5.09
See application file for complete search history.

(56) References Cited

U.S. PATENT DOCUMENTS

| | | | | |
|---|---|---|---|---|
| 4,533,242 | A * | 8/1985 | McLauchlan et al. | 356/5.07 |
| 4,861,158 | A * | 8/1989 | Breen | 356/5.09 |
| 5,262,836 | A * | 11/1993 | Nourrcier | 356/5.09 |
| 6,618,531 | B1 * | 9/2003 | Goto et al. | 385/122 |
| 6,829,042 | B1 * | 12/2004 | Yoshimura et al. | 356/5.01 |
| 2002/0048012 | A1 * | 4/2002 | Stann | 356/5.09 |
| 2002/0071109 | A1 * | 6/2002 | Allen et al. | 356/5.01 |
| 2005/0265407 | A1 * | 12/2005 | Braun et al. | 372/30 |

FOREIGN PATENT DOCUMENTS

| | | | |
|---|---|---|---|
| JP | B2 3390755 | | 1/2003 |
| JP | 3390755 | B2 * | 3/2003 |

* cited by examiner

*Primary Examiner*—Thomas H Tarcza
*Assistant Examiner*—Timothy A Brainard
(74) *Attorney, Agent, or Firm*—Oliff & Berridge, PLC

(57) ABSTRACT

A distance measurement device that provides high speed and accuracy. A light divider separates pulsed light emitted from an ultrashort pulse fiber laser into reference light A and signal light. A scanning mirror unit irradiates an object with the signal light and receives scattered light B, which is reflected from the object. An optical path length adjustment unit adjusts an optical path length of the reference light A. A differential detector detects the degree of interference of the reference light A having the adjusted optical path length with the scattered light B and outputs the detected degree of interference as an interference signal. A computer specifies an adjustment value, set in the optical path length adjustment unit, to attain a specific optical path length maximizing the interference signal and uses the specified adjustment value to compute the distance from the scanning mirror unit to the object.

15 Claims, 7 Drawing Sheets

DISTANCE MEASUREMENT DEVICE AND DISTANCE MEASUREMENT METHOD

BACKGROUND OF THE INVENTION

1. Field of the Invention

The present invention relates to a distance measurement device and a distance measurement method. More specifically the invention pertains to a distance measurement device that measures a distance to an object and a corresponding distance measurement method.

2. Description of the Prior Art

A conventional distance measurement method adopts an image processing technique to measure the distance to an object. This technique captures images of an object in two different shooting directions and processes the captured images of the object in the different shooting directions and computes a distance from a reference position to the surface of the object, based on the processed images.

A proposed technique relating to intense pulsed light varies the wavelength of the pulsed light according to the intensity of the pulsed light (see, for example, Japanese Patent No. 3390755). This technique utilizes the characteristic of a polarization-maintaining optical fiber that varies the wavelength of light according to the intensity of the light.

SUMMARY OF THE INVENTION

As described above, the prior art distance measurement method captures images of an object in different shooting directions, processes the captured images of the object, and computes the distance to the object based on the processed images. This takes a significantly long time for measurement of the distance to the object. The image processing and the computation may be simplified to shorten the total time required for the measurement. The simplified image processing and computation, however, undesirably lowers the measurement accuracy. This prior art method also requires regulation of the shooting positions of the object. The inadequate regulation may lower the accuracy of measurement of the distance to the object.

The distance measurement device and the distance measurement method of the invention thus aim to enable high-speed measurement of a distance to an object. The distance measurement device and the distance measurement method of the invention also aim to enable highly-accurate measurement of a distance to an object.

In order to attain at least part of the above and the other related objects, the distance measurement device and the corresponding distance measurement method of the invention have configurations described below.

The present invention is directed to a distance measurement device that measures a distance to an object. The distance measurement device of the invention includes: a short pulse light source that generates and emits pulsed light at a short interval; a light divider unit that separates the pulsed light emitted by the short pulse light source into signal light and reference light; an irradiation and light-receiving unit that irradiates the object with the signal light separated by the light divider unit and receives scattered light, which is reflected from the object irradiated with the signal light; a transmission time adjustment module that inputs the reference light separated by the light divider unit, adjusts a transmission time of the reference light, and outputs the reference light of the adjusted transmission time; an interference signal generation module that combines the reference light of the adjusted transmission time output from the transmission time adjustment module with the scattered light received by the irradiation and light-receiving unit and generates an interference signal based on the combination of the reference light with the scattered light; and a distance computation module that computes a distance from a radiation point of the signal light to the object, based on the transmission time of the reference light adjusted by the transmission time adjustment module and the interference signal generated by the interference signal generation module.

The distance measurement device of the invention irradiates the object with signal light as a division of the pulsed light emitted at the short interval and receives the scattered light, which is reflected from the object irradiated with the signal light. The distance measurement device also adjusts the transmission time of the reference light as a division of the pulsed light emitted at the short interval. The distance measurement device generates an interference signal, based on combination of the reference light of the adjusted transmission time with the scattered light, and computes the distance from the radiation point of the signal light to the object, based on the adjusted transmission time of the reference light and the interference signal. The linearity and the high speed of the pulsed light are used for computation of the distance from the radiation point of the signal light to the object. The arrangement of the distance measurement device thus enables high-speed and highly-accurate measurement of the distance to the object.

In the distance measurement device of the invention, the transmission time adjustment module may regulate an optical path length of the reference light to adjust the transmission time of the reference light. In this case, the distance from the radiation point to the object may be computed based on the optical path length of the reference light, instead of the adjusted transmission time of the reference light.

In one preferable embodiment of the invention, the distance measurement device further includes a wavelength change unit that varies a wavelength of the pulsed light emitted by the short pulse light source. The light divider unit separates the pulsed light having the wavelength varied by the wavelength change unit into the signal light and the reference light. The transmission time adjustment module adjusts the transmission time of the reference light according to the varied wavelength of the reference light. The transmission time of the reference light is adjustable by simply varying the wavelength of the pulsed light. The distance to the object is accurately measurable at high speed by referring to the transmission time that corresponds to the wavelength of the pulsed light to give an interference signal having a large degree of interference.

In the preferable embodiment of the distance measurement device having the wavelength change unit, the wavelength change unit may have an intensity regulation element that regulates an intensity of the pulsed light emitted by the short pulse light source, and a variable wavelength element that varies the wavelength of the input pulsed light according to the intensity of the pulsed light and outputs the pulsed light of the varied wavelength. The intensity regulation element may be an acousto-optical modulator, and the variable wavelength element may be a polarization-maintaining optical fiber.

In the preferable embodiment of the distance measurement device having the wavelength change unit, the wavelength change unit may successively vary the wavelength of the pulsed light at a longer cycle than the short interval of the emission of the pulsed light from the short pulse light source. The wavelength of the pulsed light is automatically and repeatedly variable at the longer cycle than the short interval of the pulse output from the short pulse light source. This arrangement enables high-speed and highly-accurate automatic measurement of the distance to the object.

In the preferable embodiment of the distance measurement device having the wavelength change unit, the transmission time adjustment module may include a polarization-maintaining optical fiber. The transmission time of the reference light is adjustable corresponding to the wavelength of the reference light by simply introducing the reference light into the optical fiber. In one preferable structure, the transmission time adjustment module has an optical path length adjustment unit that adjusts either an optical path length of the reference light input into the optical fiber or an optical path length of reference light output from the optical fiber. This structure adjusts the optical path length of the reference light and thus facilitates the measurement of the distance to the object.

In the preferable embodiment of the distance measurement device having the wavelength change unit, the distance computation module may compute the distance from the radiation point of the signal light to the object, based on the wavelength of the reference light, instead of the adjusted transmission time of the reference light.

In the distance measurement device of the invention, the interference signal generation module may detect a difference between two divisional signals obtained by the combination of the reference light with the scattered light and output the detected difference as the interference signal. In the distance measurement device of the invention, the short pulse light source may emit the pulsed light having a center wavelength of output pulses close to 1560 nm and a pulse width of picoseconds to femtoseconds.

In the distance measurement device of the invention, the irradiation and light-receiving unit may radiate the signal light to scan a predetermined range of the object with the signal light. The distance to the predetermined range of the object is thus automatically measurable. Namely the surface roughness of the object is accurately measurable at high-speed. This arrangement ensures high-speed three-dimensional measurement of the object with high accuracy.

In another preferable embodiment of the invention, the distance measurement device further includes a modulation unit that modulates the reference light having the transmission time adjusted by the transmission time adjustment module to modulated light of a predetermined frequency band, and the interference signal generation module uses the modulated light as the reference light and generates the interference signal. The interference signal is generated more adequately with this structure. In this case, the modulation unit may be an acousto-optical modulator or an electro-optical modulator.

In the preferable embodiment of the distance measurement device having the modulation unit, the distance computation module may include a band-pass filter that extracts only a signal of the predetermined frequency band from the generated interference signal and allows transmission of the signal of the predetermined frequency band, and a square law detector that causes the signal of the predetermined frequency band transmitted through the band-pass filter to go through square law detection, and the distance computation module may compute the distance from the radiation point of the signal light to the object, based on the square-law detected signal.

The present invention is also directed to a first distance measurement method that measures a distance to an object. The first distance measurement method of the invention includes the steps of: (a) separating pulsed light, which is emitted at a short interval, into signal light and reference light; (b) irradiating the object with the signal light as a division of the pulsed light and receiving scattered light, which is reflected from the object irradiated with the signal light; (c) adjusting a transmission time of the reference light as a division of the pulsed light; (d) generating an interference signal, based on combination of the reference light of the adjusted transmission time with the scattered light; and (e) computing a distance from a radiation point of the signal light to the object, based on the adjusted transmission time of the reference light and the generated interference signal.

The first distance measurement method of the invention irradiates the object with signal light as a division of the pulsed light emitted at the short interval and receives the scattered light, which is reflected from the object irradiated with the signal light. The method also adjusts the transmission time of the reference light as a division of the pulsed light emitted at the short interval. The method generates an interference signal, based on combination of the reference light of the adjusted transmission time with the scattered light, and computes the distance from the radiation point of the signal light to the object, based on the adjusted transmission time of the reference light and the interference signal. The linearity and the high speed of the pulsed light are used for computation of the distance from the radiation point of the signal light to the object. The arrangement of the first distance measurement method thus enables high-speed and highly-accurate measurement of the distance to the object.

The present invention is further directed to a second distance measurement method that measures a distance to an object. The second distance measurement method of the invention includes the steps of: (a) varying a wavelength of pulsed light, which is emitted at a short interval; (b) separating the pulsed light of the varied wavelength into signal light and reference light; (c) irradiating the object with the signal light as a division of the pulsed light and receiving scattered light, which is reflected from the object irradiated with the signal light; (d) adjusting a transmission time of the reference light as a division of the pulsed light according to a wavelength of the reference light; (e) generating an interference signal, based on combination of the reference light of the adjusted transmission time with the scattered light; and (f) computing a distance from a radiation point of the signal light to the object, based on either the adjusted transmission time of the reference light or the wavelength of the reference light and the generated interference signal.

The second distance measurement method of the invention varies a wavelength of pulsed light emitted at a short interval and separates the pulsed light of the varied wavelength into signal light and reference light. The method irradiates the object with the signal light as a division of the pulsed light and receives scattered light reflected from the object irradiated with the signal light. The method adjusts a transmission time of the reference light according to a wavelength of the reference light. The method generates an interference signal, based on combination of the reference light of the adjusted transmission time with the scattered light and computes a distance from a radiation point of the signal light to the object, based on either the adjusted transmission time of the reference light or the wavelength of the reference light and the generated interference signal. The linearity and the high speed of the pulsed light are used for computation of the distance from the radiation point of the signal light to the object. The arrangement of the second distance measurement method thus enables high-speed and highly-accurate measurement of the distance to the object.

DESCRIPTION OF THE PREFERRED EMBODIMENTS

Figure 1:
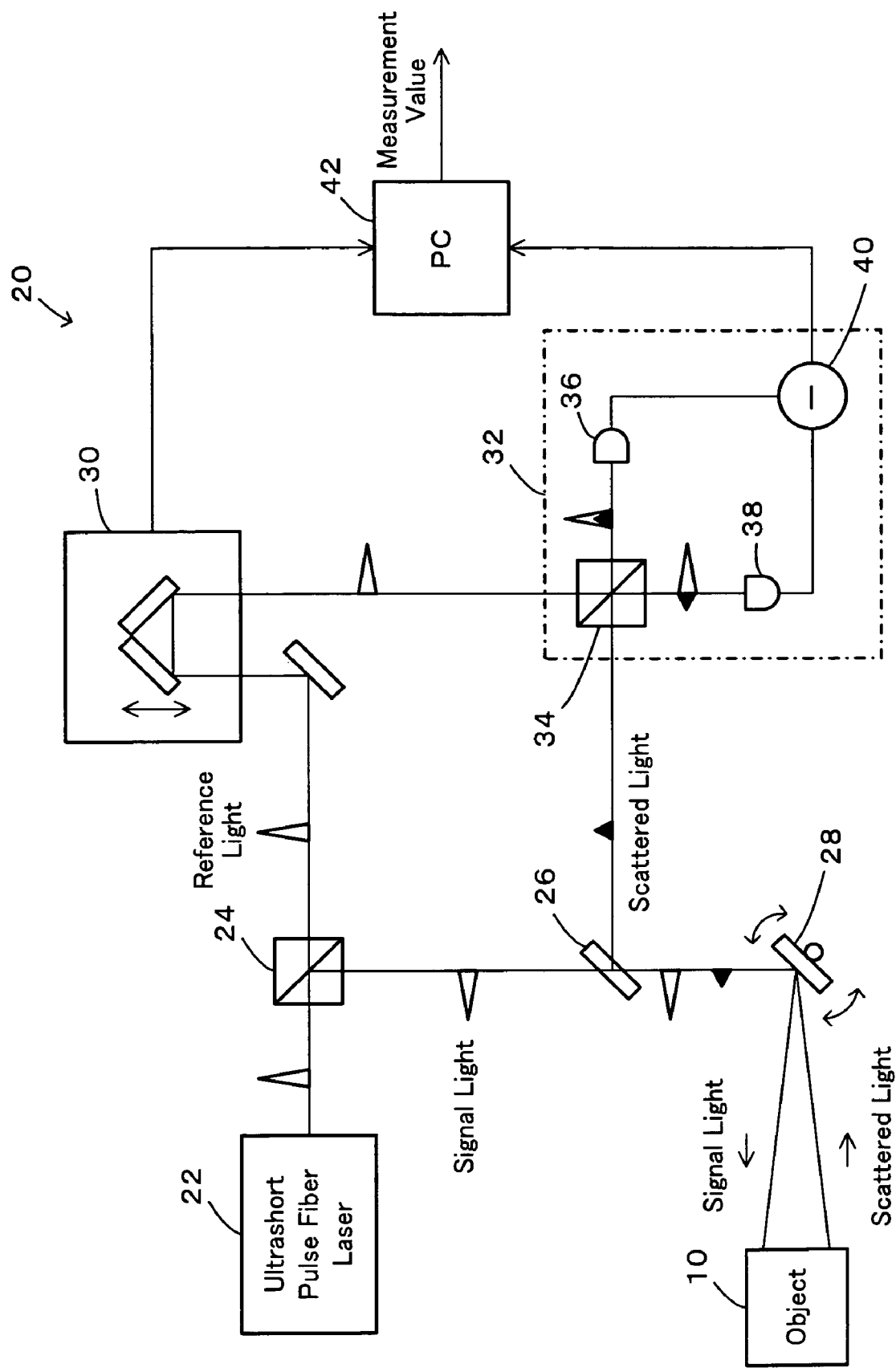
FIG. 1 schematically illustrates the configuration of a distance measurement device 20 in a first embodiment.

Some modes of carrying out the invention are described below as preferred embodiments. FIG. 1 schematically illustrates the configuration of a distance measurement device 20 in a first embodiment of the invention. As illustrated in FIG. 1, the distance measurement device 20 of the first embodiment includes an ultrashort pulse fiber laser 22 that generates pulsed light having a pulse width of picoseconds to femtoseconds, a light divider 24 that separates the pulsed light generated by the ultrashort pulse fiber laser 22 into signal light and reference light A, and a scanning mirror unit 28 that scans and irradiates an object 10 with the signal light separated by the light divider 24, receives scattered light B reflected from the object 10 irradiated with the signal light, and outputs the received scattered light B. The distance measurement device 20 of the first embodiment further includes an optical path length adjustment unit 30 that adjusts an optical path length of the reference light A separated by the light divider 24 and outputs the reference light A of the adjusted optical path length, an interference signal generator 32 that generates an interference signal in response to the reference light A of the adjusted optical path length output from the optical path length adjustment unit 30 and the scattered light B transmitted from the scanning mirror unit 28, and a computer 42 working as an operator to use an adjustment value set in the optical path length adjustment unit 30 for adjustment of the optical path length of the reference light A and the interference signal generated by the interference signal generator 32 and compute a distance from the scanning mirror unit 28 to the object 10. A semi-transmissive mirror 26 is provided between the light divider 24 and the scanning mirror unit 28 to allow transmission of the signal light from the light divider 24 but reflect the scattered light B from the scanning mirror unit 28.

The ultrashort pulse fiber laser 22 adopted in this embodiment stably generates intense pulsed light having a wavelength of 1560 nm, a pulse width (time width) of 141 femtoseconds (fs), a pulse repetition frequency of 48 MHz, and an average output of 38 mW. The pulsed light is, however, not restricted to these properties but may have, for example, a pulse width (time width) of any other suitable femtoseconds (fs) or milliseconds (ms) and a pulse repetition frequency of any other suitable MHz, kHz, or GHz.

The scanning mirror unit 28 used in this embodiment is a biaxial rotary scanner having the resolving power of 2,560,000 pulses/degree in azimuthal angle and of 921,600 pulses/degree in elevation angle. This resolving power is, however, not restrictive and the scanning mirror unit 28 may have any other suitable resolving power. The optical path length adjustment unit 30 may be structured as a multiple reflection system including multiple mirrors.

The interference signal generator 32 includes a light addition-difference computation unit 34, light detectors 36 and 38, and a differential detector 40. The light addition-difference computation unit 34 combines the reference light A of the adjusted optical path length from the optical path length adjustment unit 30 and the scattered light B from the scanning mirror unit 28 and generates a numerical addition (A+B) and a numerical difference (A−B) of the reference light A and the scattered light B. The light detectors 36 and 38 respectively receive the numerical addition (A+B) and the numerical difference (A−B) of the reference light A and the scattered light B and output respective squared electric field amplitudes $(A+B)^2$ and $(A-B)^2$ of the numerical addition (A+B) and the numerical difference (A−B). The differential detector 40 computes a difference (4AB) between the outputs $(A+B)^2$ and $(A-B)^2$ of the light detectors 36 and 38 and outputs the computed difference (4AB) as the interference signal.

While the optical path length adjustment unit 30 sequentially varies the optical path length of the reference light A, the computer 42 working as the operator specifies an adjustment value set in the optical path length adjustment unit 30 to attain a specific optical path length that maximizes the interference signal output from the differential detector 40. The computer 42 uses the specified adjustment value and computes a distance from a reference position of the scanning mirror unit 28 (for example, a position of a mirror for radiation of the pulsed light) to the object 10. The adjustment value may be specified corresponding to the optical path length or a transmission time required for transmission of the pulsed light along the optical path length.

Figure 2:
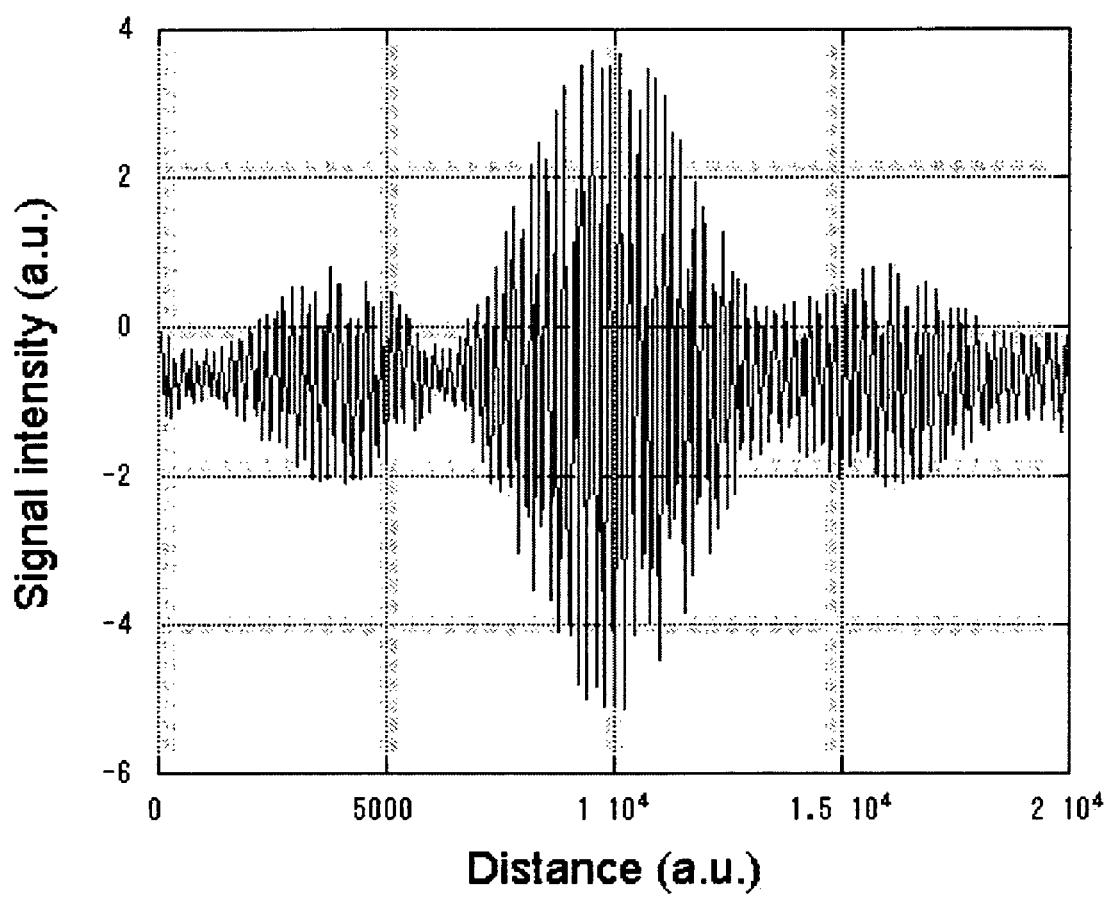
FIG. 2 FIG. 2 shows one example of the interference signal.

The description regards the operations of the distance measurement device 20 of the first embodiment having the configuration described above. The pulsed light is emitted from the ultrashort pulse fiber laser 22 and is separated into reference light A and signal light by the light divider 24. The signal light is transmitted through the semi-transmissive mirror 26 and is directed to irradiate the object 10 by the scanning mirror unit 28. Scattered light B is then reflected from the object 10 irradiated with the signal light. Part of the scattered light B is reflected by the semi-transmissive mirror 26 via the scanning mirror unit 28 and enters the interference signal generator 32. The optical path length adjustment unit 30 adjusts the optical path length of the reference light A and accordingly regulates a transmission time of the reference light A through the optical path length adjustment unit 30, that is, a time required for output of the reference light A from the optical path length adjustment unit 30. The reference light A of the adjusted optical path length enters the interference signal generator 32. In the interference signal generator 32, the light addition-difference computation unit 34 combines the input reference light A with the input scattered light B and generates the numerical addition (A+B) and the numerical difference (A−B) of the reference light A and the scattered light B. The light detectors 36 and 38 respectively output the squared electric field amplitudes $(A+B)^2$ and $(A-B)^2$. The differential detector 40 outputs the computed difference (4AB) between the outputs $(A+B)^2$ and $(A-B)^2$ as the interference signal. FIG. 2 shows one example of the interference signal. As mentioned above, while the optical path length adjustment unit 30 sequentially varies the optical path length of the reference light A, the computer 42 working as the operator specifies the adjustment value set in the optical path length adjustment unit 30 to attain the specific optical path length that maximizes the interference signal output from the differential detector 40, and uses the specified adjustment value to compute the distance from the reference position of the scanning mirror unit 28 (for example, the position of the mirror for radiation of the pulsed light) to the object 10. In this manner, the distance measurement device 20 of the first embodiment determines the distance to the irradiated location of the object 10 with the pulsed light. In the illustrated example of FIG. 2, the distance to the object 10 is determined corresponding to the peak of signal intensity. In the configuration of the first embodiment, the pulsed light having both the linearity and the high speed is used to determine the distance to the object 10. The distance measurement device 20 of the first embodiment thus enables high-speed and highly-accurate measurement of the distance to the object 10. In the distance measurement device 20 of the first embodiment, the above series of distance measurement operations are repeated with successive variations of the azimuthal angle and the elevation angle of the scanning mirror unit 28 to scan the whole surface of the object 10 with the pulsed light. The whole surface of the object 10 is accordingly measurable for the distance from the reference position of the scanning mirror unit 28 in the range of the resolving power of the scanning mirror unit 28. This attains three-dimensional measurement of the whole surface of the object 10. The distance measurement device 20 of the first embodiment uses the pulsed light emitted from the ultrashort pulse fiber laser 22. Scanning the whole surface of the object 10 by the scanning mirror unit 28 is accordingly completed within a short time. The arrangement of the first embodiment thus enables high-speed, three-dimensional measurement of the whole surface of the object 10 with high accuracy.

As described above, in the configuration of the first embodiment, the pulsed light having both the linearity and the high speed is used to determine the distance to the object 10. The distance measurement device 20 of the first embodiment thus enables the high-speed and highly-accurate measurement of the distance to the object 10. The whole surface of the object 10 is measurable for the distance from the reference position of the scanning mirror unit 28 in the range of the resolving power of the scanning mirror unit 28. The distance measurement device 20 of the first embodiment uses the pulsed light emitted from the ultrashort pulse fiber laser 22. Scanning the whole surface of the object 10 by the scanning mirror unit 28 is accordingly completed within a short time. The arrangement of the first embodiment thus enables high-speed, three-dimensional measurement of the whole surface of the object 10 with high accuracy.

Figure 3:
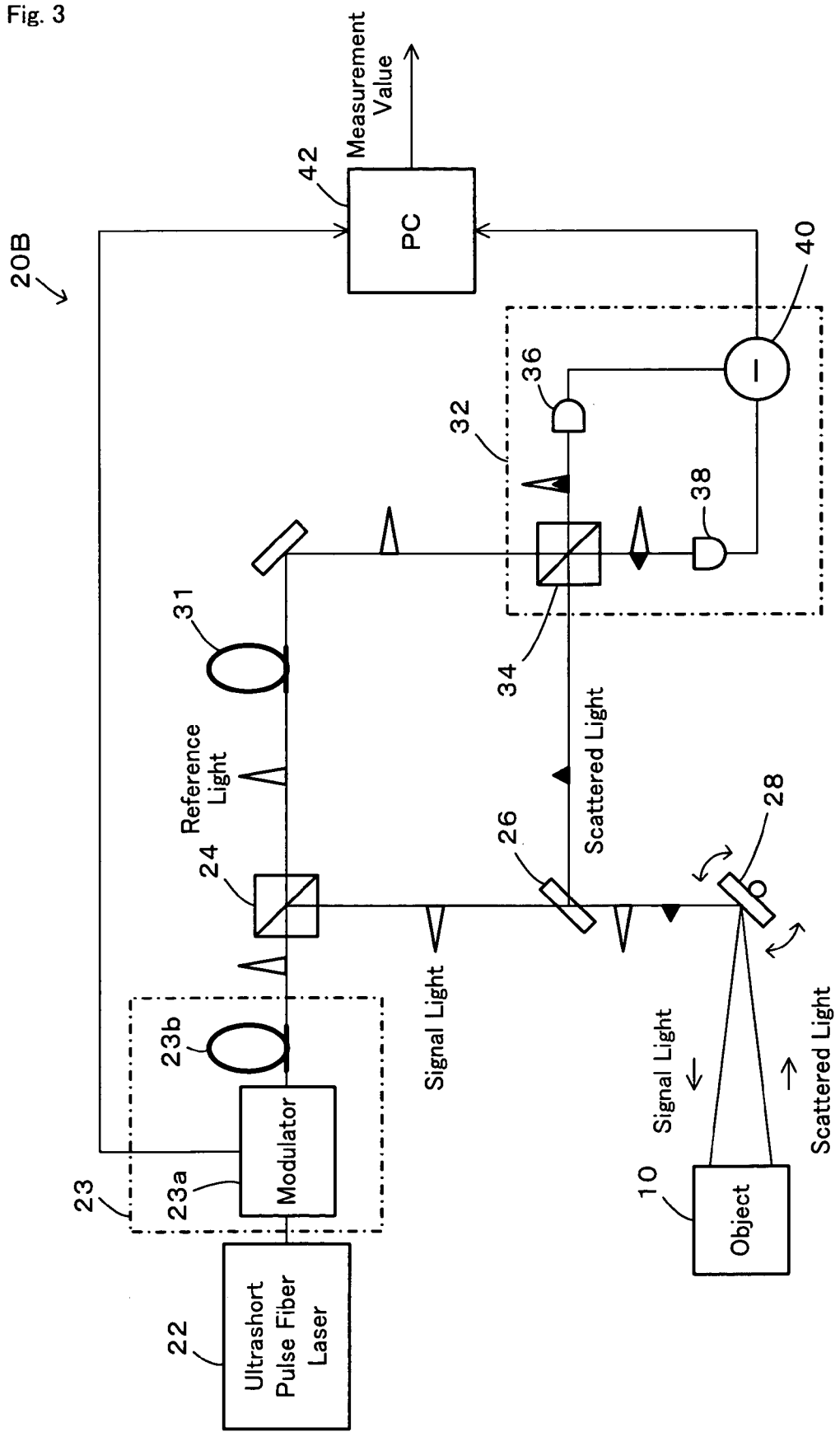
FIG. 3 schematically illustrates the configuration of a distance measurement device 20B in a second embodiment.

Another distance measurement device 20B is described below as a second embodiment of the invention. FIG. 3 schematically illustrates the configuration of the distance measurement device 20B in the second embodiment of the invention. The distance measurement device 20B of the second embodiment has the similar configuration to that of the distance measurement device 20 of the first embodiment, except that a wavelength change unit 23 is located between the ultrashort pulse fiber laser 22 and the light divider 24 to vary the wavelength of the pulsed light emitted from the ultrashort pulse fiber laser 22, that the optical path length adjustment unit 30 is replaced by a transmission time adjustment optical fiber 31, and that the computer 42 uses an intensity signal from the wavelength change unit 23, instead of the adjustment value set in the optical path adjustment unit 30, to computes the distance to the object 10. The like elements of the distance measurement unit 20B of the second embodiment to those of the distance measurement unit 20 of the first embodiment are expressed by the like numerals and symbols and are not specifically described here.

Figure 4:
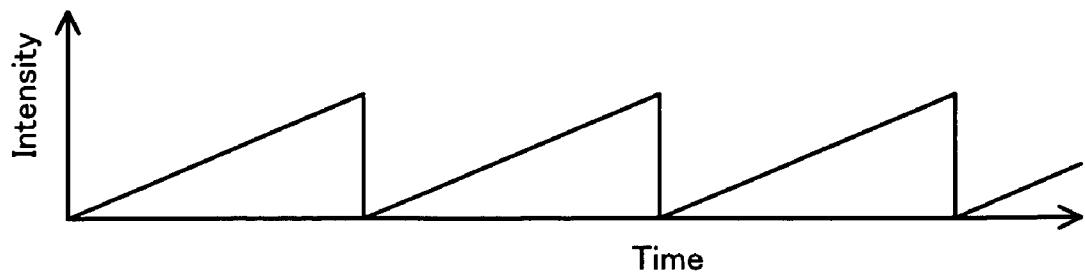
FIG. 4 shows a variation in intensity of the pulsed light modulated by a modulator 23a against time.

In the distance measurement device 20B of the second embodiment, the wavelength change unit 23 includes a modulator 23a that modulates the intensity of the pulsed light from the ultrashort pulse fiber laser 22 and a variable wavelength optical fiber 23b that varies the wavelength of the pulsed light according to the intensity of the pulsed light. The modulator 23a adopted in this embodiment is an acousto-optical modulator having a transmission rate of not lower than 75% in a modulation bandwidth of 1.8 MHz. The modulator 23a is adjusted to modulate the intensity of the pulsed light and generate sawtooth wave having a period of 10 kHz. The modulated intensity of the pulsed light is output as an adjustment value of the wavelength of the pulsed light to the computer 42. The graph of FIG. 4 shows a variation in intensity of the pulsed light modulated by the modulator 23a against time. The modulator 23a is not restricted to the acousto-optical modulator of the above performance but may be any acousto-optical modulator of any suitable performance or any other modulator that is capable of modulating the intensity of the pulsed light emitted from the ultrashort pulse fiber laser 22. The variable wavelength optical fiber 23b adopted in this embodiment is a thin polarization-maintaining fiber (core diameter: 8.1 μm, length: 100 m). The principle of varying the wavelength of the pulsed light according to the intensity of the pulsed light is discussed in detail in Japanese Patent Application No. H10-275604 by the inventors of the present invention and is applied to the present invention. This principle is, however, not characteristic of the present invention and is thus not specifically described here. The variable wavelength optical fiber 23b is not restricted to the thin polarization-maintaining fiber but may be any optical fiber or even non-optical fiber that is capable of varying the wavelength of the pulsed light according to the intensity of the pulsed light.

Figure 5:
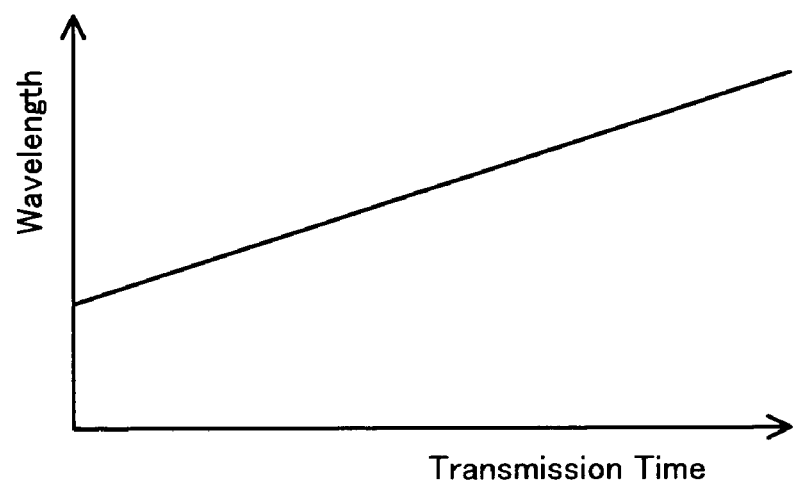
FIG. 5 shows a variation in wavelength of the pulsed light against the transmission time.

The transmission time adjustment optical fiber 31 varies the transmission time from the input to the output of the pulsed light according to the wavelength of the pulsed light. The transmission time adjustment optical fiber 31 adopted in this embodiment is a polarization-maintaining dispersion-shifted fiber (length: 100 m). The graph of FIG. 5 shows a variation in wavelength of the pulsed light against the transmission time. The transmission time adjustment optical fiber 31 is not restricted to the polarization-maintaining dispersion-shifted fiber but may be any optical fiber or even non-optical fiber that is capable of varying the transmission time from the input to the output of the pulsed light according to the wavelength of the pulsed light.

The description regards the operations of the distance measurement device 20B of the second embodiment having the configuration described above. The pulsed light is emitted from the ultrashort pulse fiber laser 22 and enters the wavelength change unit 23. The modulator 23a in the wavelength change unit 23 modulates the intensity of the pulsed light, and the variable wavelength optical fiber 23b varies the wavelength of the pulsed light according to the modulated intensity of the pulsed light. The pulsed light of the varied wavelength is separated into reference light A and signal light by the light divider 24. The signal light is transmitted through the semi-transmissive mirror 26 and is directed to irradiate the object 10 by the scanning mirror unit 28. Scattered light B is then reflected from the object 10 irradiated with the signal light. Part of the scattered light B is reflected by the semi-transmissive mirror 26 via the scanning mirror unit 28 and enters the interference signal generator 32. The reference light A has the transmission time adjusted by the transmission time adjustment optical fiber 31 and enters the interference signal generator 32. As described above with reference to the first embodiment, in the interference signal generator 32, the light addition-difference computation unit 34 combines the input reference light A with the input scattered light B and generates the numerical addition (A+B) and the numerical difference (A−B) of the reference light A and the scattered light B. The light detectors 36 and 38 respectively output the squared electric field amplitudes $(A+B)^2$ and $(A-B)^2$. The differential detector 40 outputs the computed difference (4AB) between the outputs $(A+B)^2$ and $(A-B)^2$ as the interference signal.

There may be an interference of the reference light A and the scattered light B combined by the light addition-difference computation unit 34. The transmission time of the reference light A is adjusted by the transmission time adjustment optical fiber 31. It is here assumed that the optical path length of the reference light A from the light divider 24 to the light addition-difference computation unit 34 excluding the transmission time adjustment optical fiber 31 is equal to the optical path length of the signal light and the scattered light B from the light divider 24 to the light addition-difference computation unit 34 excluding twice a distance between the scanning mirror unit 28 and the object 10. Under such conditions, the reference light A interferes with the scattered light B when the transmission time of the reference light A adjusted by the transmission time adjustment optical fiber 31 is equal to the sum of a transmission time as an integral multiple of the interval of the pulsed light emitted from the ultrashort pulse fiber laser 22 and a time required for transmission of light through the air along twice the distance between the scanning mirror 28 and the object 10. The transmission time of the reference light A adjusted by the transmission time adjustment optical fiber 31 is varied according to the wavelength of the pulsed light. The reference light A interfering with the scattered light B is accordingly the pulsed light of a wavelength determined according to the distance between the scanning mirror unit 28 and the object 10. Namely the wavelength of the interfering reference light A depends upon the distance from the scanning mirror unit 28 to the object 10. In the configuration of the second embodiment, the frequency of the modulator 23*a* is 10 kHz, which is significantly smaller than the frequency 48 MHz of the ultrashort pulse fiber laser 22. The object 10 is thus irradiated with a large number of light pulses of an identical wavelength in one period of the modulator 23*a*. The reference light A interfering with the scattered light B is accordingly reference light A obtained as a division of some integral-previous light pulse separated by the light divider 24. While the wavelength change unit 23 periodically changes the intensity of the pulsed light and thus periodically varies the wavelength of the pulsed light, the computer 42 working as the operator specifies the wavelength of the pulsed light corresponding to a peak of the interference signal, which is input from the differential detector 40 of the interference signal generator 32, based on the intensity (adjustment value) set in the modulator 23*a* for modulation of the intensity of the pulsed light. The computer 42 then specifies the transmission time set in the transmission time adjustment optical fiber 31 for adjustment of the transmission time of the reference light A, based on the specified wavelength of the pulsed light, and uses the specified transmission time to compute the distance from the reference position of the scanning mirror unit 28 (for example, the position of the mirror for radiation of the pulsed light) to the object 10. In this manner, the distance measurement device 20B of the second embodiment determines the distance to the irradiated location of the object 10 with the pulsed light. The configuration of the second embodiment uses the wavelength change unit 23 to vary the wavelength of the pulsed light and the transmission time adjustment optical fiber 31 to adjust the transmission time of the reference light A, and specifies the wavelength of the reference light A interfering with the scattered light B. The specified wavelength of the interfering reference light A eventually determines the distance from the scanning mirror unit 28 to the object 10. The distance measurement device 20B of the second embodiment does not require adjustment of the optical path length, which is performed by the optical path length adjustment unit 30 in the distance measurement device 20 of the first embodiment. As described above with reference to the first embodiment, in the configuration of the second embodiment, the pulsed light having both the linearity and the high speed is used to determine the distance to the object 10. The distance measurement device 20B of the second embodiment thus enables high-speed and highly-accurate measurement of the distance to the object 10. Like the first embodiment, in the distance measurement device 20B of the second embodiment, the above series of distance measurement operations are repeated with successive variations of the azimuthal angle and the elevation angle of the scanning mirror unit 28 to scan the whole surface of the object 10 with the pulsed light. The whole surface of the object 10 is accordingly measurable for the distance from the reference position of the scanning mirror unit 28 in the range of the resolving power of the scanning mirror unit 28. This attains three-dimensional measurement of the whole surface of the object 10. The distance measurement device 20B of the second embodiment uses the pulsed light emitted from the ultrashort pulse fiber laser 22. Scanning the whole surface of the object 10 by the scanning mirror unit 28 is accordingly completed within a short time. The arrangement of the second embodiment thus enables high-speed, three-dimensional measurement of the whole surface of the object 10 with high accuracy.

As described above, in the configuration of the second embodiment, the pulsed light having both the linearity and the high speed is used to determine the distance to the object 10. The distance measurement device 20B of the second embodiment thus enables the high-speed and highly-accurate measurement of the distance to the object 10. The configuration of the second embodiment uses the wavelength change unit 23 to vary the wavelength of the pulsed light and the transmission time adjustment optical fiber 31 to adjust the transmission time of the reference light A, and specifies the wavelength of the reference light A interfering with the scattered light B. The specified wavelength of the interfering reference light A eventually determines the distance from the scanning mirror unit 28 to the object 10. The distance measurement device 20B of the second embodiment does not require adjustment of the optical path length, which is performed by the optical path length adjustment unit 30 in the distance measurement device 20 of the first embodiment. The whole surface of the object 10 is measurable for the distance from the reference position of the scanning mirror unit 28 in the range of the resolving power of the scanning mirror unit 28. The distance measurement device 20B of the second embodiment uses the pulsed light emitted from the ultrashort pulse fiber laser 22. Scanning the whole surface of the object 10 by the scanning mirror unit 28 is accordingly completed within a short time. The arrangement of the second embodiment thus enables high-speed, three-dimensional measurement of the whole surface of the object 10 with high accuracy.

In the distance measurement device 20B of the second embodiment, the computer 42 specifies the wavelength of the pulsed light corresponding to a peak of the interference signal, which is input from the differential detector 40 of the interference signal generator 32, based on the intensity (adjustment value) set in the modulator 23a for modulation of the intensity of the pulsed light. The computer 42 then specifies the transmission time set in the transmission time adjustment optical fiber 31 for adjustment of the transmission time of the reference light A, based on the specified wavelength of the pulsed light, and uses the specified transmission time to compute the distance from the reference position of the scanning mirror unit 28 (for example, the position of the mirror for radiation of the pulsed light) to the object 10. One possible modification may specify the intensity set in the modulator 23a for modulation of the intensity of the pulsed light, corresponding to a peak of the interference signal input from the differential detector 40 of the interference signal generator 32, specify the transmission time set in the transmission time adjustment optical fiber 31 for adjustment of the transmission time of the reference light A, based on the specified intensity, and use the specified transmission time to compute the distance from the reference position of the scanning mirror unit 28 (for example, the position of the mirror for radiation of the pulsed light) to the object 10. The transmission time set in the transmission time adjustment optical fiber 31 may be replaced by an optical path length corresponding to the transmission time set in the transmission time adjustment optical fiber 31.

In the distance measurement device 20B of the second embodiment, the transmission time adjustment optical fiber 31 is used to adjust the transmission time of the pulsed light. Some optical path length adjustment means, for example, the optical path length adjustment unit 30 of the first embodiment, may be provided before or after the transmission time adjustment optical fiber 31.

Figure 6:
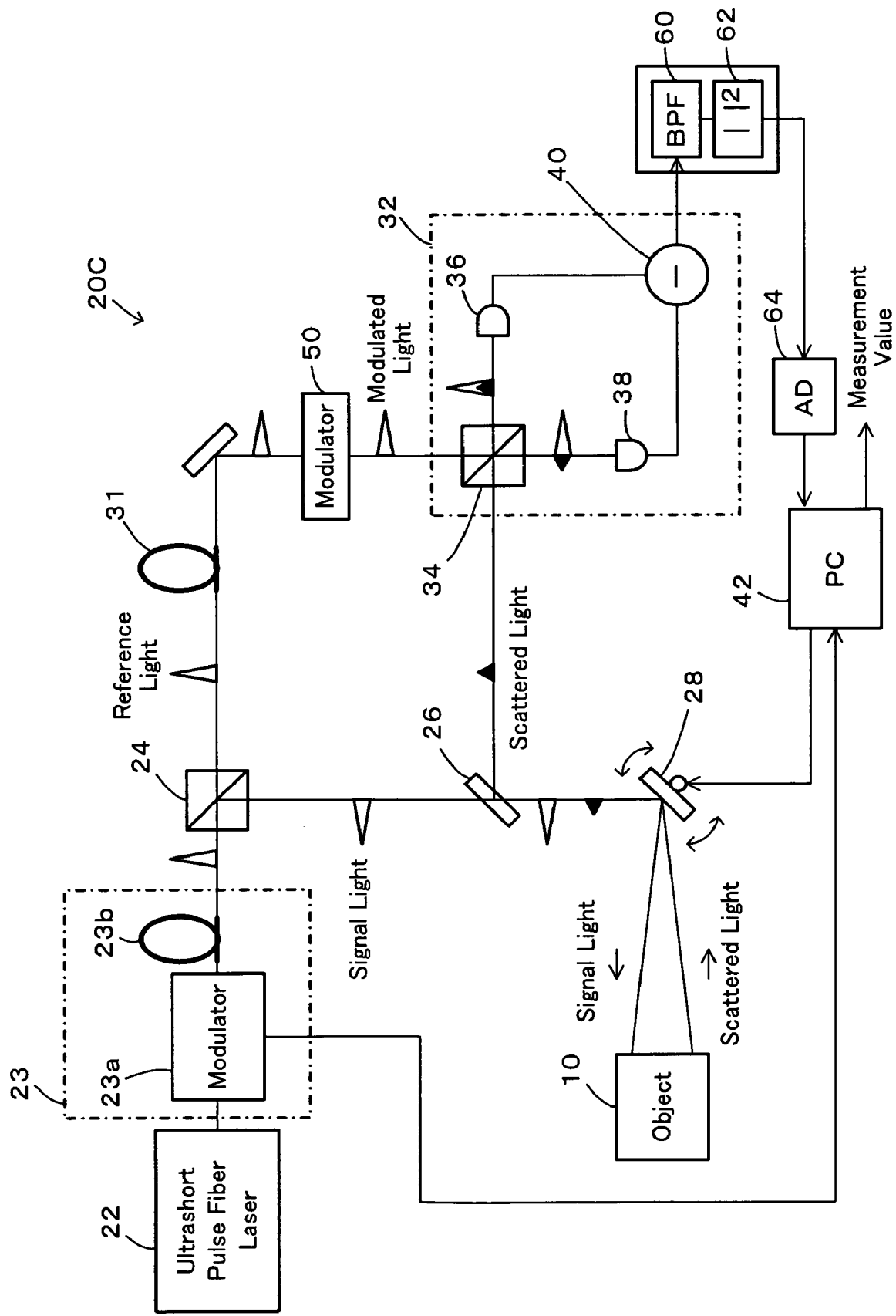
FIG. 6 schematically illustrates the configuration of a distance measurement device 20C in a third embodiment.

Still another distance measurement device 20C is described below as a third embodiment of the invention. FIG. 6 schematically illustrates the configuration of the distance measurement device 20C in the third embodiment of the invention. The distance measurement device 20C of the third embodiment has the similar configuration to that of the distance measurement device 20B of the second embodiment, except that a modulator 50 is provided between the transmission time adjustment optical fiber 31 and the interference signal generator 32 to shift a frequency band of light, that a band-pass filter 60 for allowing transmission of signals of only a specific frequency band, a square law detector 62 for performing square-law detection, and an A-D converter 64 for converting analog signals into digital signals are provided between the differential detector 40 and the computer 42, and that the scanning mirror unit 28 is under control of the computer 42. The like elements of the distance measurement unit 20C of the third embodiment to those of the distance measurement unit 20B of the second embodiment are expressed by the like numerals and symbols and are not specifically described here.

The modulator 50 adopted in this embodiment is a general acousto-optical modulator to shift the input light to a 27 MHz band. The modulator 50 inputs the reference light A having the transmission time adjusted by the transmission time adjustment optical fiber 31 and outputs modulated light A2 shifted to the 27 MHz band. The band-pass filter 60 is designed to allow transmission of interference signals in the frequency band of the modulated light A2, that is, the 27 MHz band (27 MHz±4 MHz), while prohibiting transmission of interference signals in other frequency bands.

Figure 7:
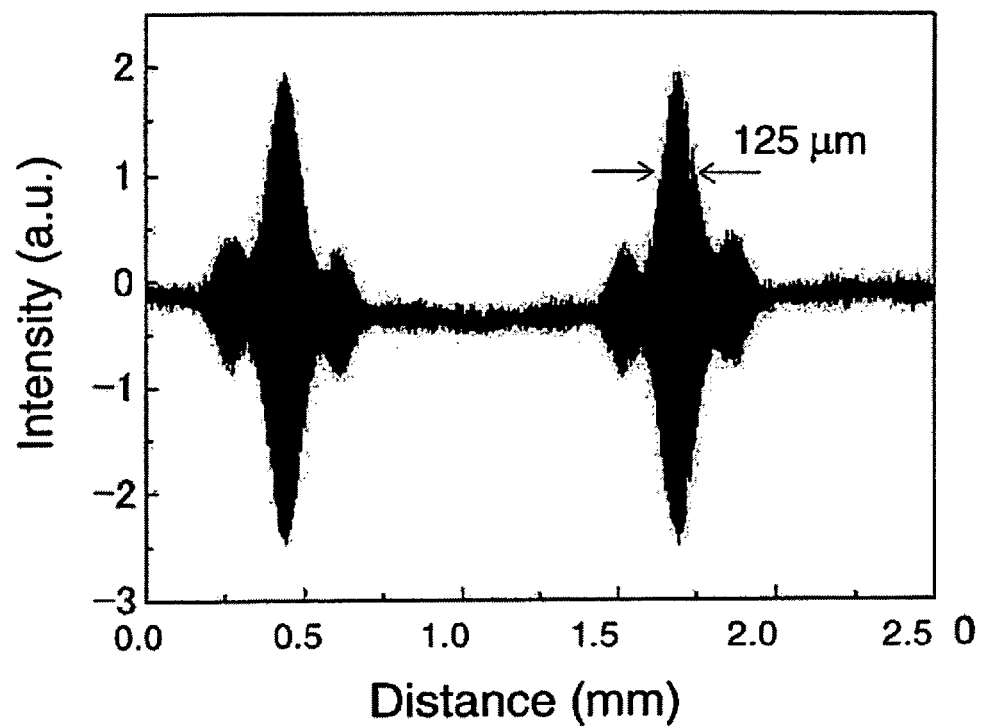
FIG. 7 shows one example of the interference signal passing through a band-pass filter 60.
Figure 8:
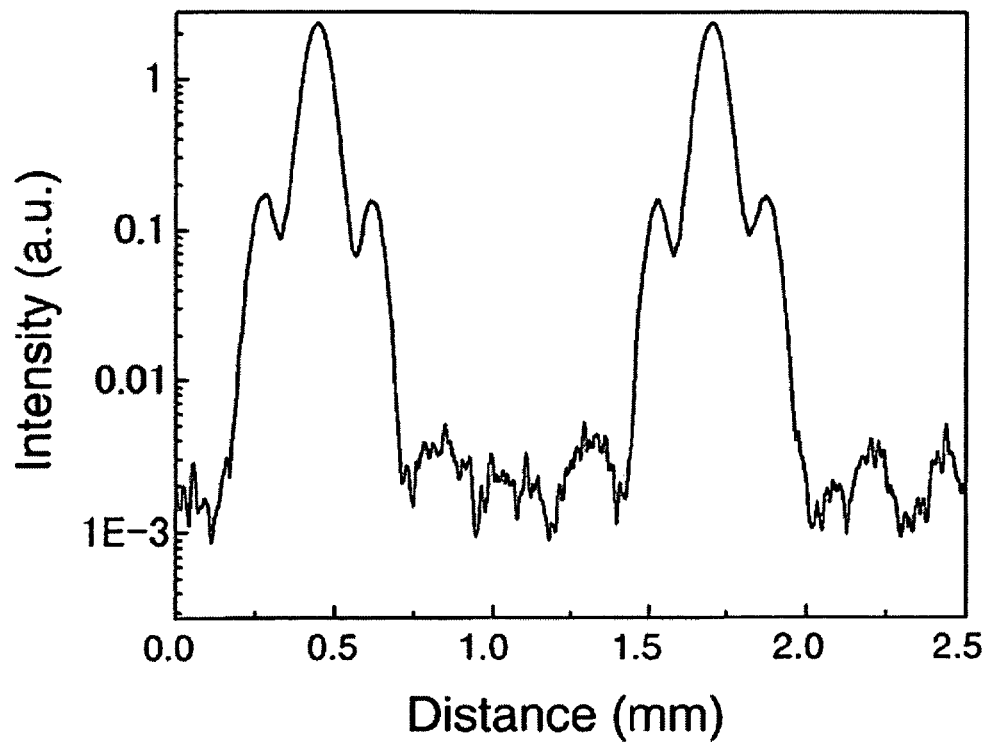
FIG. 8 shows one example of the output of a square law detector 62.
Figure 9:
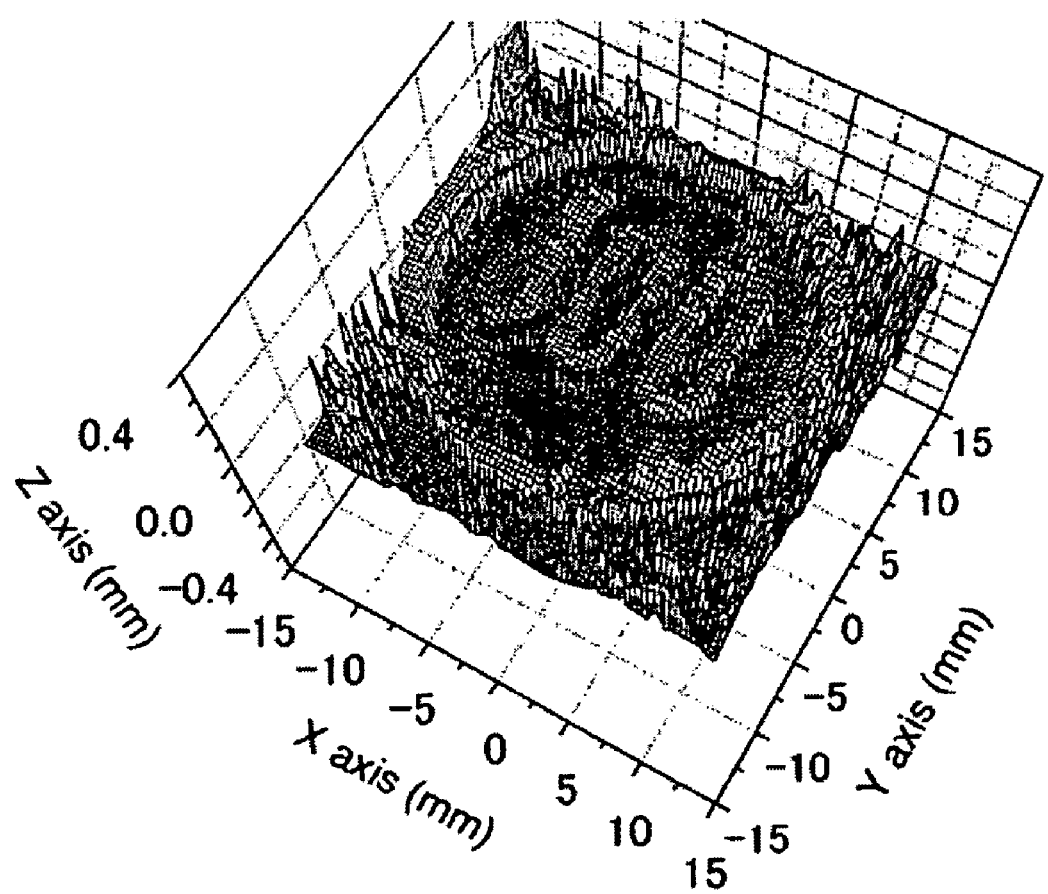
FIG. 9 shows one example of the three-dimensional measurement by the distance measurement device 20C of the third embodiment.

The description regards the operations of the distance measurement device 20C of the third embodiment having the configuration described above. Like the distance measurement device 20B of the second embodiment, the pulsed light is emitted from the ultrashort pulse fiber laser 22 and enters the wavelength change unit 23. The modulator 23a in the wavelength change unit 23 modulates the intensity of the pulsed light, and the variable wavelength optical fiber 23b varies the wavelength of the pulsed light according to the modulated intensity of the pulsed light. The pulsed light of the varied wavelength is separated into reference light A and signal light by the light divider 24. The signal light is transmitted through the semi-transmissive mirror 26 and is directed to irradiate the object 10 by the scanning mirror unit 28. Scattered light B is then reflected from the object 10 irradiated with the signal light. Part of the scattered light B is reflected by the semi-transmissive mirror 26 via the scanning mirror unit 28 and enters the interference signal generator 32. The reference light A has the transmission time adjusted by the transmission time adjustment optical fiber 31, is shifted to the modulated light A2 of the 27 MHz band by the modulator 50, and enters the interference signal generator 32. As described above with reference to the first embodiment, in the interference signal generator 32, the light addition-difference computation unit 34 combines the input modulated light A2 with the input scattered light B and generates the numerical addition (A2+B) and the numerical difference (A2−B) of the modulated light A2 and the scattered light B. The light detectors 36 and 38 respectively output the squared electric field amplitudes $(A2+B)^2$ and $(A2-B)^2$. The differential detector 40 outputs the computed difference (4(A2)B) between the outputs $(A2+B)^2$ and $(A2-B)^2$ as the interference signal. The interference signal output from the differential detector 40 enters the band-pass filter 60 for extraction of only a signal component of the 27 MHz band, successively goes through the square-law detection by the square law detector 62 and the A-D conversion by the A-D converter 64, and is input into the computer 42. FIG. 7 shows one example of the interference signal passing through the band-pass filter 60, and FIG. 8 shows one example of the output of the square law detector 62. The computer 42 working as the operator specifies the wavelength of the pulsed light corresponding to a peak of the A-D converted signal, based on the intensity (adjustment value) set in the modulator 23a for modulation of the intensity of the pulsed light. The computer 42 then specifies the transmission time set in the transmission time adjustment optical fiber 31 for adjustment of the transmission time of the reference light A, based on the specified wavelength of the pulsed light, and uses the specified transmission time to compute the distance from the reference position of the scanning mirror unit 28 (for example, the position of the mirror for radiation of the pulsed light) to the object 10. FIG. 9 shows one example of the three-dimensional measurement by the distance measurement device 20C of the third embodiment. This illustrated example shows three-dimensional measurement of an object with the resolving power of 10 μm.

In the distance measurement device 20C of the third embodiment described above, the reference light A has the transmission time adjusted by the transmission time adjustment optical fiber 31, is shifted to the modulated light A2 of the 27 MHz band by the modulator 50, and enters the interference signal generator 32. The interference signal generated by the interference signal generator 32 passes through the band-pass filter 60 corresponding to the frequency band of the modulated light A2, that is, the 27 MHz band. The signal of 27 MHz band extracted by the band-pass filter 60 is used for computation of the distance from the reference position of the scanning mirror unit 28 (for example, the position of the mirror for radiation of the pulsed light) to the object 10. This arrangement ensures accurate determination of the distance. In the configuration of the third embodiment, the pulsed light having both the linearity and the high speed is used to determine the distance to the object 10. The distance measurement device 20C of the third embodiment thus enables the high-speed and highly-accurate measurement of the distance to the object 10. The configuration of the third embodiment uses the wavelength change unit 23 to vary the wavelength of the pulsed light and the transmission time adjustment optical fiber 31 to adjust the transmission time of the reference light A, and specifies the wavelength of the modulated light A2 interfering with the scattered light B. The specified wavelength of the interfering reference light A eventually determines the distance from the scanning mirror unit 28 to the object 10. The distance measurement device 20C of the third embodiment does not require adjustment of the optical path length, which is performed by the optical path length adjustment unit 30 in the distance measurement device 20 of the first embodiment. The whole surface of the object 10 is measurable for the distance from the reference position of the scanning mirror unit 28 in the range of the resolving power of the scanning mirror unit 28. The distance measurement device 20C of the third embodiment uses the pulsed light emitted from the ultrashort pulse fiber laser 22. Scanning the whole surface of the object 10 by the scanning mirror unit 28 is accordingly completed within a short time. The arrangement of the third embodiment thus enables high-speed, three-dimensional measurement of the whole surface of the object 10 with high accuracy.

The modulator 50 adopted in the distance measurement device 20C of the third embodiment is the acousto-optical modulator that shifts the reference light A to the 27 MHz band. The shifted frequency band is, however, not restricted to the 27 MHz band. The modulator 50 may be any acousto-optical modulator that shifts the reference light A to any suitable frequency band. In this case, the band-pass filter 60 is selected corresponding to the shifted frequency band. The modulator 50 is not limited to the acousto-optical modulator but may be another modulator, for example, an electro-optical modulator. A modulator with the capability of varying the shifted frequency band is especially preferable. Appropriate regulation of the shifted frequency band enables three-dimensional measurement with higher accuracy.

The distance measurement device 20C of the third embodiment has the modulator 50, the band-pass filter 60, the square law detector 62, and the A-D converter 64 in addition to the structure of the distance measurement device 20B of the second embodiment. The modulator 50, the band-pass filter 60, the square law detector 62, and the A-D converter 64 may alternatively be added to the structure of the distance measurement device 20 of the first embodiment.

The above embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

What is claimed is:

1. A distance measurement device that measures a distance to an object, said distance measurement device comprising:
    a short pulse light source that generates and emits pulsed light at a short interval;
    a light divider unit that separates the pulsed light emitted by the short pulse light source into signal light and reference light;
    an irradiation and light-receiving unit capable of variations in azimuthal angle and elevation angle that irradiates the object with the signal light separated by the light divider unit and receives scattered light, which is reflected from the object irradiated with the signal light;
    a transmission time adjustment module that inputs the reference light separated by the light divider unit, adjusts a delay time of the reference light, and outputs the reference light of the adjusted delay time;
    an interference signal generation module that combines the reference light of the adjusted delay time output from said transmission time adjustment module with the scattered light received by the irradiation and light-receiving unit and generates an interference signal based on the combination of the reference light with the scattered light;
    a semi-transmissive mirror that allows the signal from the light divider to pass through, but reflects the scattered light from the object to the interference signal generation module;
    a distance computation module that computes a distance from a radiation point of the signal light to the object, based on the delay time of the reference light adjusted by said transmission time adjustment module and the interference signal generated by said interference signal generation module; and
    a wavelength change unit that varies a wavelength of the pulsed light emitted by the short pulse light source;
    wherein the light divider unit separates the pulsed light having the wavelength varied by the wavelength change unit into the signal light and the reference light,
    the wavelength change unit varies the wavelength of the pulsed light in order to achieve a peak interference signal, and
    said transmission time adjustment module adjusts the delay time of the reference light according to the varied wavelength of the reference light.

2. A distance measurement device in accordance with claim 1, wherein said transmission time adjustment module regulates an optical path length of the reference light to adjust the delay time of the reference light.

3. A distance measurement device in accordance with claim 1, wherein the wavelength change unit has an intensity regulation element that regulates an intensity of the pulsed light emitted by the short pulse light source, and a variable wavelength element that varies the wavelength of the input pulsed light according to the intensity of the pulsed light and outputs the pulsed light of the varied wavelength.

4. A distance measurement device in accordance with claim 3, wherein the intensity regulation element is an acousto-optical modulator, and the variable wavelength element is a polarization-maintaining optical fiber.

5. A distance measurement device in accordance with claim 1, wherein the wavelength change unit successively varies the wavelength of the pulsed light at a longer cycle than the short interval of the emission of the pulsed light from the short pulse light source.

6. A distance measurement device in accordance with claim 1, wherein said transmission time adjustment module comprises a polarization-maintaining optical fiber.

7. A distance measurement device in accordance with claim 6, wherein said transmission time adjustment module comprises an optical path length adjustment unit that adjusts either an optical path length of the reference light input into the optical fiber or an optical path length of reference light output from the optical fiber.

8. A distance measurement device in accordance with claim 1, wherein said distance computation module computes the distance from the radiation point of the signal light to the object, based on the wavelength of the reference light, instead of the adjusted delay time of the reference light.

9. A distance measurement device in accordance with claim 1, wherein said interference signal generation module detects a difference between two divisional signals obtained by the combination of the reference light with the scattered light and outputs the detected difference as the interference signal.

10. A distance measurement device in accordance with claim 1, wherein the short pulse light source emits the pulsed light having a center wavelength of output pulses close to 1560 nm and a pulse width of picoseconds to femtoseconds.

11. A distance measurement device in accordance with claim 1, wherein the irradiation and light-receiving unit radiates the signal light to scan a predetermined range of the object with the signal light.

12. A distance measurement device in accordance with claim 1, said distance measurement device further comprising:
a modulation unit that modulates the reference light having the delay time adjusted by said transmission time adjustment module to modulated light of a predetermined frequency band,
wherein said interference signal generation module uses the modulated light as the reference light and generates the interference signal.

13. A distance measurement device in accordance with claim 12, wherein the modulation unit is either an acousto-optical modulator or an electro-optical modulator.

14. A distance measurement device in accordance with claim 12, wherein said distance computation module comprises a band-pass filter that extracts only a signal of the predetermined frequency band from the generated interference signal and allows transmission of the signal of the predetermined frequency band, and a square law detector that causes the signal of the predetermined frequency band transmitted through the band-pass filter to go through square law detection, and
said distance computation module computes the distance from the radiation point of the signal light to the object, based on the square-law detected signal.

15. A distance measurement method that measures a distance to an object, said distance measurement method comprising the steps of:
(a) varying a wavelength of pulsed light, which is emitted at a short interval;
(b) separating the pulsed light of the varied wavelength into signal light and reference light;
(c) irradiating the object with the signal light as a division of the pulsed light and receiving scattered light, which is reflected from the object irradiated with the signal light, wherein irradiating the object includes enabling variations in azimuthal angle and elevation angle by an irradiation and light receiving unit;
(d) adjusting a delay time of the reference light as a division of the pulsed light according to a wavelength of the reference light;
(e) generating an interference signal, based on combination of the reference light of the adjusted delay time with the scattered light;
(f) allowing the signal light to pass through a semi-transmissive mirror but reflecting the scattered light hitting the semi-transmissive mirror; and
(g) computing a distance from a radiation point of the signal light to the object, based on either the adjusted delay time of the reference light or the wavelength of the reference light and the generated interference signal.

* * * * *